US012808301B2

(12) United States Patent
Lavine

(10) Patent No.: US 12,808,301 B2
(45) Date of Patent: Nov. 24, 2026

(54) TURBINE BLADE FOR A GAS TURBINE ENGINE

(71) Applicant: RTX Corporation, Farmington, CT (US)

(72) Inventor: Griffin D. Lavine, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 164 days.

(21) Appl. No.: 18/794,374

(22) Filed: Aug. 5, 2024

(65) Prior Publication Data

US 2026/0036054 A1 Feb. 5, 2026

(51) Int. Cl.
*F01D 5/18* (2006.01)

(52) U.S. Cl.
CPC ............ *F01D 5/18* (2013.01); *F05D 2260/20* (2013.01)

(58) Field of Classification Search
CPC ................................ F01D 5/18; F05D 2260/20
See application file for complete search history.

(56) References Cited

U.S. PATENT DOCUMENTS

| | | | | |
|---|---|---|---|---|
| 2,873,944 | A * | 2/1959 | Wiese | F01D 5/189 416/96 A |
| 4,312,624 | A * | 1/1982 | Steinbauer, Jr. | F01D 5/189 415/115 |
| 8,562,295 | B1 * | 10/2013 | Liang | F01D 5/189 29/889.7 |
| 10,731,477 | B2 | 8/2020 | Quach | |
| 2006/0104818 | A1 * | 5/2006 | McMillan | F01D 5/147 416/232 |
| 2012/0076645 | A1 | 3/2012 | Tibbott | |
| 2014/0093386 | A1 * | 4/2014 | Pointon | F01D 5/187 416/95 |
| 2017/0211392 | A1 * | 7/2017 | Lutjen | F01D 5/187 |
| 2017/0275998 | A1 | 9/2017 | Lee | |
| 2017/0361418 | A1 * | 12/2017 | Twelves | B24B 31/006 |
| 2019/0003316 | A1 * | 1/2019 | Morton | F01D 5/188 |
| 2020/0018172 | A1 | 1/2020 | Tapia | |
| 2024/0102391 | A1 | 3/2024 | Spangler | |

OTHER PUBLICATIONS

EP Search Report for EP Patent Application No. 25194172.0 dated Dec. 12, 2025.

* cited by examiner

*Primary Examiner* — Andrew J Marien
(74) *Attorney, Agent, or Firm* — Getz Balich LLC

(57) ABSTRACT

A turbine blade for a gas turbine engine includes a blade body. The blade body includes a pressure side wall, a suction side wall, an intermediate wall, and at least one core body portion. The pressure side wall or the suction side wall forms a hot wall of the blade body. The intermediate wall is disposed between the pressure side wall and the suction side wall. The at least one core body portion is disposed between the hot wall and the intermediate wall. The at least one core body portion forms at least one periodic passage. The at least one periodic passage includes at least one hot wall segment and at least one cold wall segment. The hot wall segment is further formed by the hot wall and spaced from the intermediate wall. The cold wall segment is further formed by the intermediate wall and spaced from the hot wall.

18 Claims, 7 Drawing Sheets

TURBINE BLADE FOR A GAS TURBINE ENGINE

BACKGROUND

1. Technical Field

This disclosure relates generally to gas turbine engines and, more particularly, to turbine blades for a gas turbine engine.

2. Background Information

A gas turbine engine typically includes a turbine section. The turbine section may include one or more turbines such as, but not limited to, a low-pressure turbine and a high-pressure turbine. These turbines may include multiple stages of blades and vanes. As fluid flows through the turbine section, the flow causes the blades to rotate about an axis of rotation. Temperatures within the turbine section may be relatively high, as the flow of fluid is received initially from a combustor of the gas turbine engine. Cooling air may be extracted from a compressor section of the gas turbine engine and used to cool the gas path components, for example, the blades of the turbines. Various turbine blade configurations are known in the art for mitigating the impact of high turbine section temperatures on turbine blade materials. While these known turbine blade configurations may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a turbine blade for a gas turbine engine includes a blade body. The blade body extends in a spanwise direction between and to a base end and a tip end. The blade body extends in a chordwise direction between and to a leading edge and a trailing edge. The blade body includes a pressure side wall, a suction side wall, an intermediate wall, and at least one core body portion. The pressure side wall or the suction side wall forms a hot wall of the blade body. The hot wall extends between and to the leading edge and the trailing edge. The intermediate wall is disposed between the pressure side wall and the suction side wall. The intermediate wall extends between the leading edge and the trailing edge. The at least one core body portion is disposed between the hot wall and the intermediate wall. The at least one core body portion forms at least one periodic passage through the blade body. The at least one periodic passage includes at least one hot wall segment and at least one cold wall segment. The hot wall segment is further formed by the hot wall and spaced from the intermediate wall by the at least one core body portion. The cold wall segment is further formed by the intermediate wall and spaced from the hot wall by the at least one core body portion.

In any of the aspects or embodiments described above and herein, the at least one periodic passage may be periodic in the spanwise direction.

In any of the aspects or embodiments described above and herein, the at least one periodic passage may be periodic in the chordwise direction.

In any of the aspects or embodiments described above and herein, the at least one periodic passage may include a first helical periodic passage centered about a passage axis.

In any of the aspects or embodiments described above and herein, the at least one periodic passage may include a second helical periodic passage centered about the passage axis.

In any of the aspects or embodiments described above and herein, the at least one periodic passage may include a plurality of periodic passages. A first subset of the plurality of periodic passages may be periodic in the spanwise direction. A second subset of the plurality of periodic passages may be periodic in the chordwise direction.

In any of the aspects or embodiments described above and herein, the first subset of the plurality of periodic passages and the second subset of the plurality of periodic passages may form a woven array of the plurality of periodic passages.

In any of the aspects or embodiments described above and herein, the pressure side wall, the suction side wall, the intermediate wall, and the at least one core body portion may form a unitary component of the blade body.

In any of the aspects or embodiments described above and herein, the blade body may further include a plurality of ribs including a first rib and a second rib. The first rib and the second rib may extend between and to the hot wall and the intermediate wall. The at least one core body portion may be disposed between the first rib and the second rib.

In any of the aspects or embodiments described above and herein, the blade body may have a mean camber line extending through the leading edge and the trailing edge. The intermediate wall may extend along the mean camber line between the leading edge and the trailing edge.

According to another aspect of the present disclosure, a turbine blade for a gas turbine engine includes a blade body. The blade body extends in a spanwise direction between and to a base end and a tip end. The blade body extends in a chordwise direction between and to a leading edge and a trailing edge. The blade body includes a pressure side wall, a suction side wall, an intermediate wall, a first core body portion, and a second core body portion. Each of the pressure side wall and the suction side wall extends between and to the leading edge and the trailing edge. The intermediate wall is disposed between the pressure side wall and the suction side wall. The intermediate wall extends between the leading edge and the trailing edge. The first core body portion is disposed between the pressure side wall and the intermediate wall. The second core body portion is disposed between the suction side wall and the intermediate wall. Each of the first core body portion and the second core body portion forms at least one periodic passage through the blade body. Each of the at least one periodic passage extends between and to a coolant inlet and a coolant outlet. Each of the at least one periodic passage includes a plurality of hot wall segments and a plurality of cold wall segments alternatingly positioned with the hot wall segments between the coolant inlet and the coolant outlet.

In any of the aspects or embodiments described above and herein, the at least one periodic passage may include a first periodic passage and a second periodic passage.

In any of the aspects or embodiments described above and herein, the first periodic passage and the second periodic passage may be fluidly independent.

In any of the aspects or embodiments described above and herein, the first periodic passage and the second periodic passage may extend in a same direction.

In any of the aspects or embodiments described above and herein, the first periodic passage and the second periodic passage may extend in different directions.

According to another aspect of the present disclosure, a turbine blade for a gas turbine engine includes a blade body. The blade body extends in a spanwise direction between and to a base end and a tip end. The blade body extends in a chordwise direction between and to a leading edge and a trailing edge. The blade body includes a pressure side wall, a suction side wall, an intermediate wall, and at least one core body portion. The pressure side wall or the suction side wall forms a hot wall of the blade body. The hot wall extends between and to the leading edge and the trailing edge. The intermediate wall is disposed between the pressure side wall and the suction side wall. The intermediate wall extends between the leading edge and the trailing edge. The at least one core body portion is disposed between the hot wall and the intermediate wall. The at least one core body portion forms a first periodic passage and a second periodic passage through the blade body. Each of the first periodic passage and the second periodic passage includes a plurality of hot wall segments and a plurality of cold wall segments. Each of the plurality of hot wall segments is further formed by the hot wall and spaced from the intermediate wall by the at least one core body portion. Each of the plurality of cold wall segments is further formed by the intermediate wall and spaced from the hot wall by the at least one core body portion. At least one of the hot wall segments of the first periodic passage is disposed coincident with at least one of the cold wall segments of the second periodic passage.

In any of the aspects or embodiments described above and herein, the first periodic passage and the second periodic passage may be periodic in the spanwise direction.

In any of the aspects or embodiments described above and herein, the first periodic passage may be periodic in the spanwise direction and the second periodic passage may be periodic in the chordwise direction.

In any of the aspects or embodiments described above and herein, the pressure side wall, the suction side wall, the intermediate wall, and the at least one core body portion may form a unitary component of the blade body.

In any of the aspects or embodiments described above and herein, the blade body may further include a plurality of ribs including a first rib and a second rib. The first rib and the second rib may extend between and to the hot wall and the intermediate wall. The at least one core body portion may be disposed between the first rib and the second rib.

The present disclosure, and all its aspects, embodiments and advantages associated therewith will become more readily apparent in view of the detailed description provided below, including the accompanying drawings.

DETAILED DESCRIPTION

Figure 1:
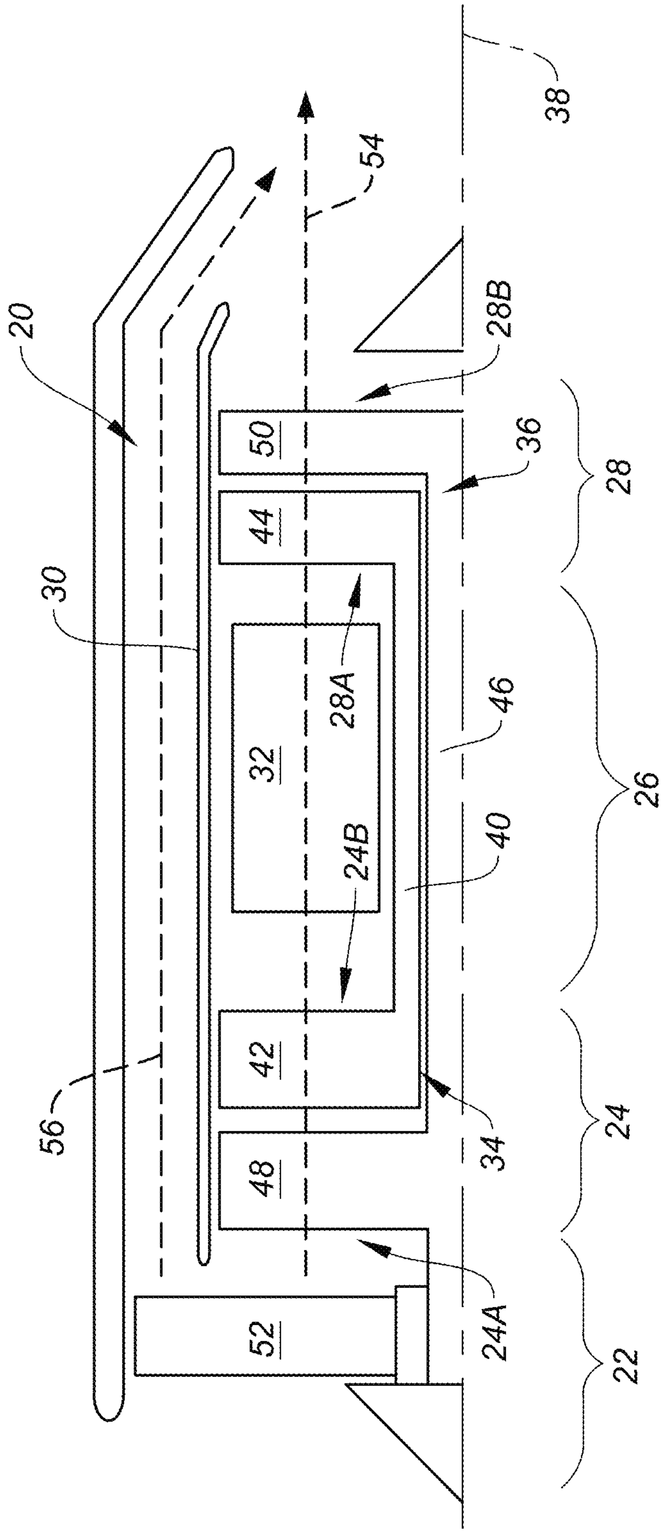
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 20 of FIG. 1 includes a fan section 22, a compressor section 24, a combustor section 26, a turbine section 28, and an engine static structure 30. The compressor section 24 of FIG. 1 includes a low-pressure compressor (LPC) 24A and a high-pressure compressor (HPC) 24B. The combustor section 26 includes a combustor 32 (e.g., an annular combustor). The turbine section 28 includes a high-pressure turbine (HPT) 28A and a low-pressure turbine (LPT) 28B.

Components of the fan section 22, the compressor section 24, and the turbine section 28 form a first rotational assembly 34 (e.g., a high-pressure spool) and a second rotational assembly 36 (e.g., a low-pressure spool) of the gas turbine engine 20. The first rotational assembly 34 and the second rotational assembly 36 are mounted for rotation about a rotational axis 38 (e.g., an axial centerline) of the gas turbine engine 20 relative to the engine static structure 30.

The first rotational assembly 34 includes a first shaft 40, a bladed first compressor rotor 42 for the high-pressure compressor 24B, and a bladed first turbine rotor 44 for the high-pressure turbine 28A. The first shaft 40 interconnects the bladed first compressor rotor 42 and the bladed first turbine rotor 44.

The second rotational assembly 36 includes a second shaft 46, a bladed second compressor rotor 48 for the low-pressure compressor 24A, and a bladed second turbine rotor 50 for the low-pressure turbine 28B. The second shaft 46 interconnects the bladed second compressor rotor 48 and the bladed second turbine rotor 50. The second shaft 46 may additionally be directly or indirectly coupled to a bladed fan rotor 52 for the fan section 22. For example, the second shaft 46 may be coupled to the bladed fan rotor 52 (e.g., an input shaft of the bladed fan rotor 52) by a reduction gear assembly configured to drive the bladed fan rotor 52 at a reduced rotational speed relative to the second shaft 46. The first shaft 40 and the second shaft 46 are concentric and configured to rotate about the rotational axis 38. The present disclosure, however, is not limited to concentric configurations of the first shaft 40 and the second shaft 46.

The engine static structure 30 may include one or more engine cases, cowlings, bearing assemblies, and/or other non-rotating structures configured to house and/or support (e.g., rotationally support) components of the gas turbine engine 20 sections 22, 24, 26, 28. The engine static structure 30 may form an exterior (e.g., an outer radial portion) of the gas turbine engine 20.

In operation of the gas turbine engine 20 of FIG. 1, ambient air is directed through the fan section 22 and into a core flow path 54 (e.g., an annular flow path) and a bypass flow path 56 (e.g., an annular flow path) by rotation of the bladed fan rotor 52. Airflow along the core flow path 54 is compressed by the low-pressure compressor 24A and the high-pressure compressor 24B, mixed and burned with fuel in the combustor 32, and then directed through the high-pressure turbine 28A and the low-pressure turbine 28B. The bladed first turbine rotor 44 and the bladed second turbine rotor 50 rotationally drive the first rotational assembly 34 and the second rotational assembly 36, respectively, in response to the combustion gas flow through the high-pressure turbine 28A and the low-pressure turbine 28B. The bypass flow path 56 may be disposed outside the engine static structure 30. For example, the engine static structure 30 and an outer aircraft propulsion system housing (e.g., a nacelle) may form an annular bypass duct radially therebetween, and airflow may be directed through the annular bypass duct along the bypass flow path 56.

Figure 2:
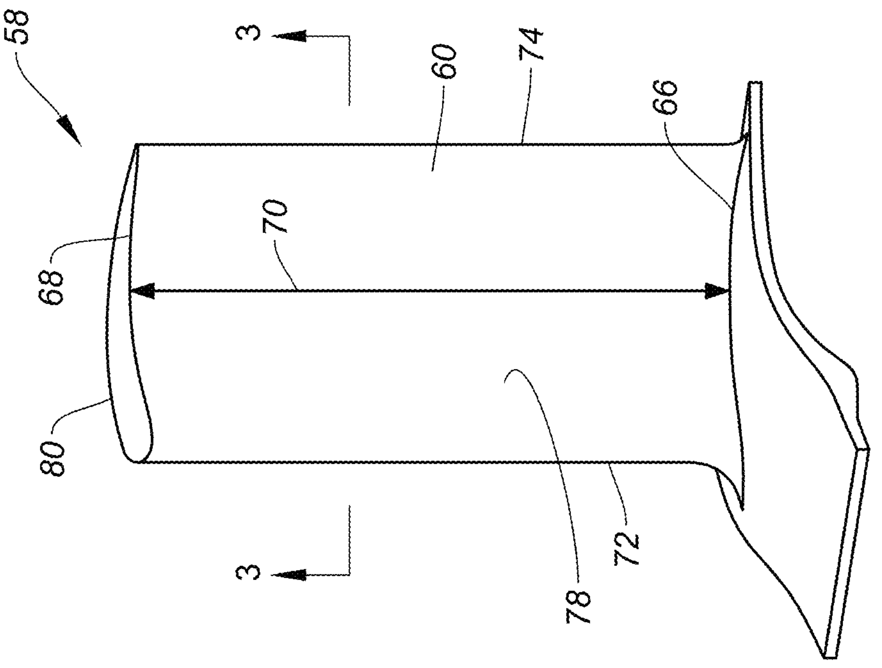
FIG. 2 schematically illustrates a perspective view of a turbine blade for a turbine section of a gas turbine engine, in accordance with one or more embodiments of the present disclosure.
Figure 3:
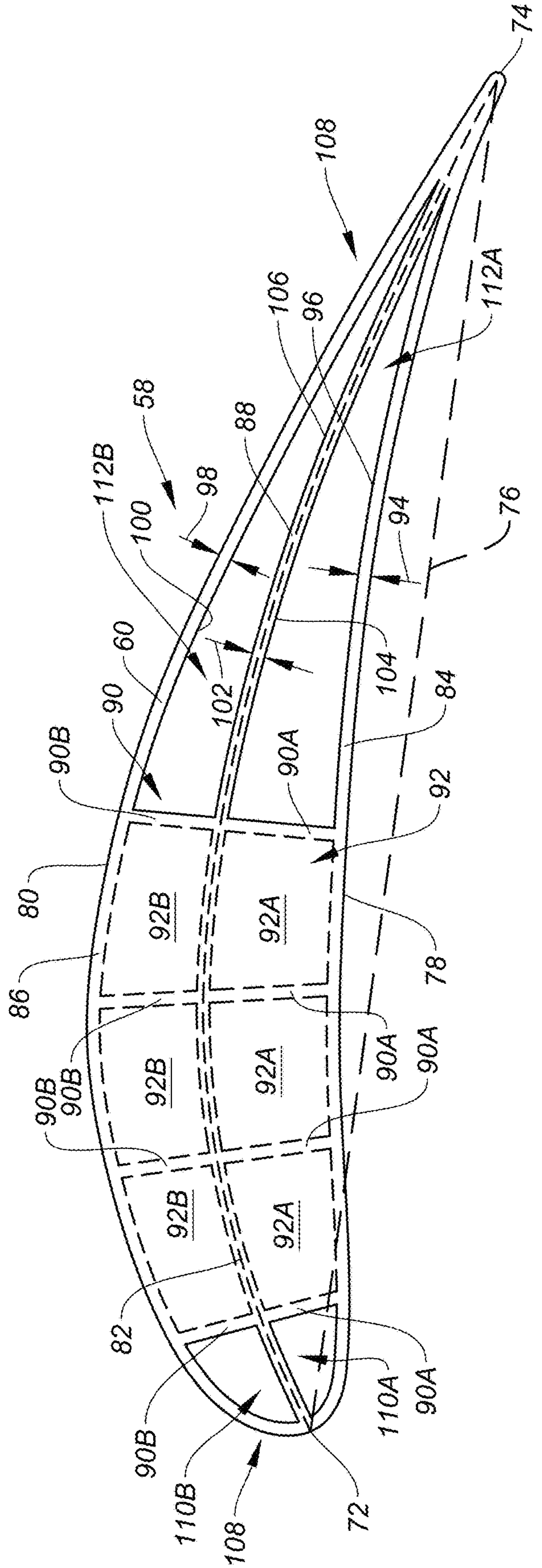
FIG. 3 schematically illustrates a cutaway view of the turbine blade taken along Line 3-3 of FIG. 2, in accordance with one or more embodiments of the present disclosure.

FIGS. 2 and 3 illustrate a turbine blade 58. FIG. 2 illustrates a perspective view of the turbine blade 58. FIG. 3 schematically illustrates a cutaway view of the turbine blade 58 taken along Line 3-3 of FIG. 2. The turbine blade 58 may be configured, for example, for use on the bladed first turbine rotor 44 and/or the bladed second turbine rotor 50 (see FIG. 1). The turbine blade 58 includes a blade body 60.

The blade body 60 extends, in a spanwise direction, between and to a base end 66 of the blade body 60 and a tip end 68 of the blade body 60. With the blade body 60 installed on a bladed turbine rotor, such as the bladed first turbine rotor 44 and/or the bladed second turbine rotor 50, the spanwise direction of the blade body 60 may be generally oriented in a radial direction of the bladed turbine rotor (e.g., relative to a rotational axis of the bladed turbine rotor). The blade body 60 has a span 70 extending between and to the base end 66 and the tip end 68 in the spanwise direction. The blade body extends, in a chordwise direction (e.g., orthogonal to the spanwise direction), between and to a leading edge 72 of the blade body 60 and a trailing edge 74 of the blade body 60. The blade body 60 has a chord line 76 extending through and intersecting the leading edge 72 and the trailing edge 74 in the chordwise direction. The blade body 60 forms a pressure side surface 78 and a suction side surface 80. The pressure side surface 78 is disposed opposite the blade body 60 from the suction side surface 80. The pressure side surface 78 and the suction side surface 80 extend between and to the base end 66 and the tip end 68. The pressure side surface 78 and the suction side surface 80 extend between and to the leading edge 72 and the trailing edge 74. The blade body 60 has a mean camber line 82 which intersects the chord line 76 at the leading edge 72 and the trailing edge 74 and which lies halfway between the pressure side surface 78 and the suction side surface 80 between the leading edge 72 and the trailing edge 74.

The blade body 60 includes a pressure side wall 84, a suction side wall 86, an intermediate wall 88, a plurality of ribs 90, and a plurality of core body portions 92. In some embodiments, the blade body 60, including the pressure side wall 84, the suction side wall 86, the intermediate wall 88, and the ribs 90, may be formed as a unitary component. The term "unitary component" as used herein means a single component, wherein the blade body 60, and its pressure side wall 84, suction side wall 86, intermediate wall 88, and ribs 90, is an inseparable body (e.g., formed of a single material). For example, the blade body 60, including the pressure side wall 84, the suction side wall 86, the intermediate wall 88, and the ribs 90 may be formed as a unitary component using an investment casting process using fugitive cores, an additive manufacturing process, or the like. In some embodiments, the core body portions 92 may be formed with the pressure side wall 84, the suction side wall 86, the intermediate wall 88, and the ribs 90 as a portion of the unitary component. In some other embodiments, the core body portions 92 may be formed separately from the pressure side wall 84, the suction side wall 86, the intermediate wall 88, and the ribs 90 in a discrete formation process (e.g., an investment casting process), and may subsequently be installed into the blade body 60.

The pressure side wall 84 extends between and to the base end 66 and the tip end 68. The pressure side wall 84 extends between and to the leading edge 72 and the trailing edge 74. The pressure side wall 84 forms the pressure side surface 78. The pressure side wall 84 has a thickness 94 extending (e.g., orthogonal to the pressure side surface 78) between and to the pressure side surface 78 and an interior side 96 of the pressure side wall 84.

The suction side wall 86 extends between and to the base end 66 and the tip end 68. The suction side wall 86 extends between and to the leading edge 72 and the trailing edge 74. The suction side wall 86 intersects the pressure side wall 84 at (e.g., on, adjacent, or proximate) the leading edge 72 and the trailing edge 74. The suction side wall 86 forms the suction side surface 80. The suction side wall 86 has a thickness 98 extending (e.g., orthogonal to the suction side surface 80) between and to the suction side surface 80 and an interior side 100 of the suction side wall 86.

The intermediate wall 88 extends through the turbine blade 58 between the pressure side wall 84 and the suction side wall 86. The intermediate wall 88 extends between the leading edge 72 and the trailing edge 74. The intermediate wall 88 may extend between and to the leading edge 72 and the trailing edge 74. Alternatively, the intermediate wall 88 may extend only a portion of a chordwise distance between the leading edge 72 and the trailing edge 74. The intermediate wall 88 may intersect the pressure side wall 84 and the suction side wall 86 at (e.g., on, adjacent, or proximate) the leading edge 72 and the trailing edge 74. The intermediate wall 88 may extend between the leading edge 72 and the trailing edge 74 along and at (e.g., on, adjacent, or proximate) the mean camber line 82 as shown in FIG. 3, however, the present disclosure is not limited to any particular position of the intermediate wall 88 relative to the mean camber line 82. The intermediate wall 88 has a thickness 102 extending between and to a pressure side 104 of the intermediate wall 88 and a suction side 106 of the intermediate wall 88. The pressure side 104 faces the pressure side wall 84. The suction side 106 faces the suction side wall 86. The intermediate wall 88 extends in the spanwise direction between the base end 66 and the tip end 68.

The ribs 90 include one or more first rib portions 90A and one or more second rib portions 90B. Each of the first rib portions 90A extends between and to the pressure side wall 84 (e.g., interior side 96) and the intermediate wall 88 (e.g., the pressure side 104). Each of the first rib portions 90A may extend orthogonally or substantially orthogonally between the pressure side wall 84 (e.g., interior side 96) and the intermediate wall 88, for example, relative to the interior side 96 and/or the pressure side 104. The present disclosure, however, is not limited to any particular orientation of the rib portions 90A relative to the pressure side wall 84 and the intermediate wall 88. The first rib portions 90A may be arrayed within the turbine blade 58 and spaced from one another along the chordwise direction. Each of the second rib portions 90B extends between and to the suction side wall 86 (e.g., interior side 100) and the intermediate wall 88 (e.g., the suction side 106). Each of the second rib portions 90B may extend orthogonally or substantially orthogonally between the suction side wall 86 (e.g., interior side 96) and the intermediate wall 88, for example, relative to the interior side 100 and/or the suction side 106. The present disclosure, however, is not limited to any particular orientation of the rib portions 90B relative to the suction side wall 84 and the intermediate wall 88. The second rib portions 90B may be arrayed within the turbine blade 58 and spaced from one another along the chordwise direction. Each of the first rib portions 90A may be aligned with a respective one of the second rib portions 90B to form a rib structure extending directly between and to the pressure side wall 84 and the suction side wall 86.

The pressure side wall 84, the suction side wall 86, the intermediate wall 88, and the ribs 90 may form a plurality of cavities 108 (e.g., cooling air cavities) within the turbine blade 58. For example, the cavities 108 of FIG. 3 include a first leading-edge cavity 110A, a second leading-edge cavity 110B, a first trailing-edge cavity 112A, and a second trailing-edge cavity 112B. The present disclosure, however, is not limited to the foregoing exemplary cavities 108 of FIG. 3. The first leading-edge cavity 110A is formed by and between the pressure side wall 84 (e.g., the interior side 96), the intermediate wall 88 (e.g., the pressure side 104), and one of the first rib portions 90A at (e.g., on, adjacent, or proximate) the leading edge 72. The second leading-edge cavity 110B is formed by and between the suction side wall 86 (e.g., the interior side 100), the intermediate wall 88 (e.g., the suction side 106), and one of the second rib portions 90B at (e.g., on, adjacent, or proximate) the leading edge 72. The first trailing-edge cavity 112A is formed by and between the pressure side wall 84 (e.g., the interior side 96), the intermediate wall 88 (e.g., the pressure side 104), and one of the first rib portions 90A at (e.g., on, adjacent, or proximate) the trailing edge 74. The second trailing-edge cavity 112B is formed by and between the suction side wall 86 (e.g., the interior side 100), the intermediate wall 88 (e.g., the suction side 106), and one of the second rib portions 90B at (e.g., on, adjacent, or proximate) the trailing edge 74.

The core body portions 92 form an interior structure of the blade body 60 bounded by the pressure side wall 84, the suction side wall 86, the intermediate wall 88, and the ribs 90. For example, the core body portions 92 of FIG. 3 include one or more first core body portions 92A and one or more second core body portions 92B. Each of the first core body portions 92A of FIG. 3 is bounded by the pressure side wall 84 (e.g., the interior side 96), the intermediate wall 88 (e.g., the pressure side 104), and a pair of adjacent (e.g., chordwise adjacent) first rib portions 90A. Each of the second core body portions 92B of FIG. 3 is bounded by the suction side wall 86 (e.g., the interior side 100), the intermediate wall 88 (e.g., the suction side 106), and a pair of adjacent (e.g., chordwise adjacent) second rib portions 90B. As will be discussed in further detail, each of the core body portions forms two or more periodic passages (e.g., air passages) extending through the blade body 60. These periodic passages facilitate a reduction in temperature gradients across the blade body 60 (e.g., between the pressure side surface 78 and the intermediate wall 88 and between the suction side surface 80 and the intermediate wall 88).

Figure 4:
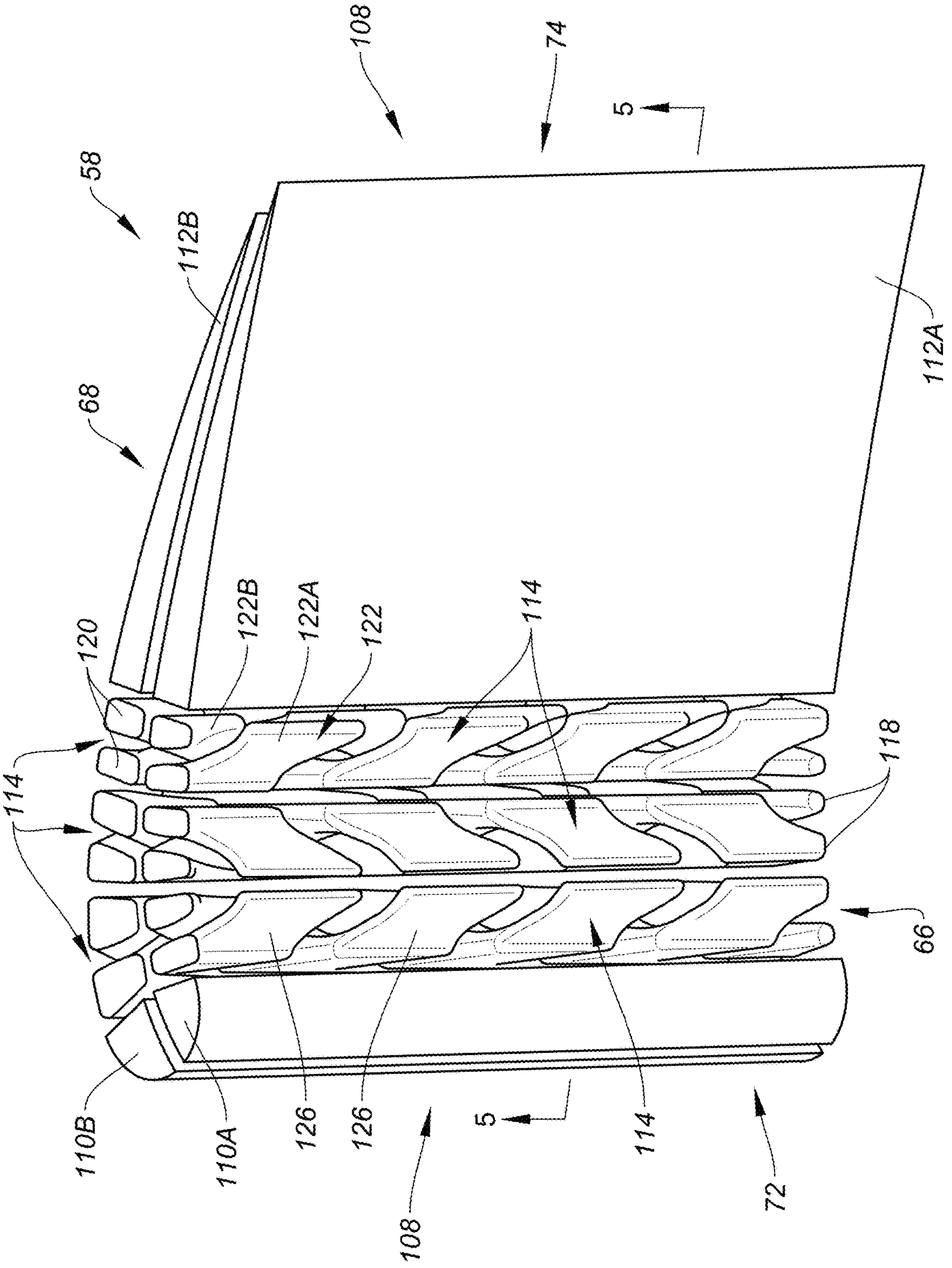
FIG. 4 illustrates a perspective view of a portion of the turbine blade with cavities and periodic passages of the turbine blade depicted positively, in accordance with one or more embodiments of the present disclosure.
Figure 5:
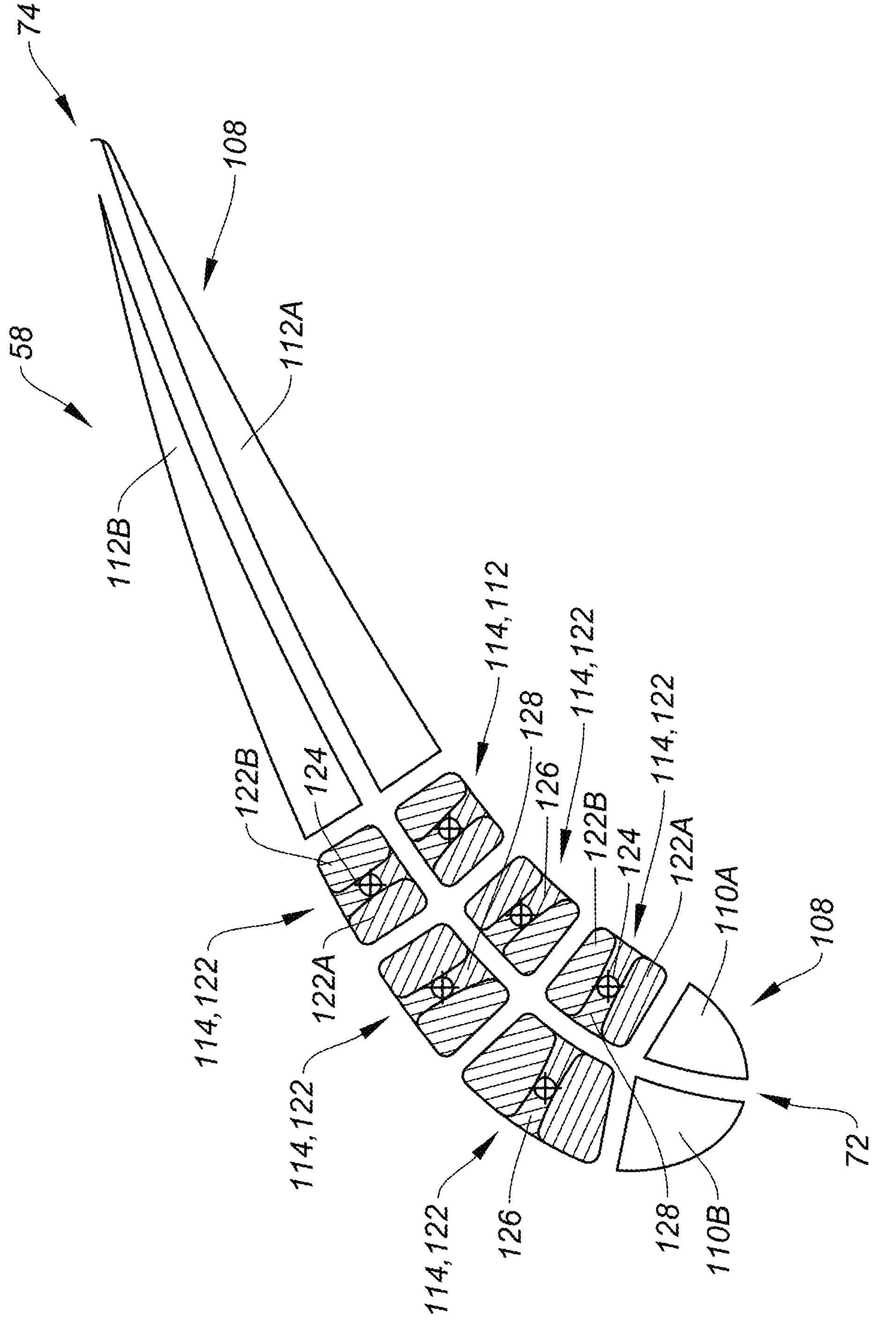
FIG. 5 illustrates a cutaway view of the turbine blade taken along Line 5-5 of FIG. 4 with cavities and periodic passages of the turbine blade depicted positively, in accordance with one or more embodiments of the present disclosure.
Figure 6:
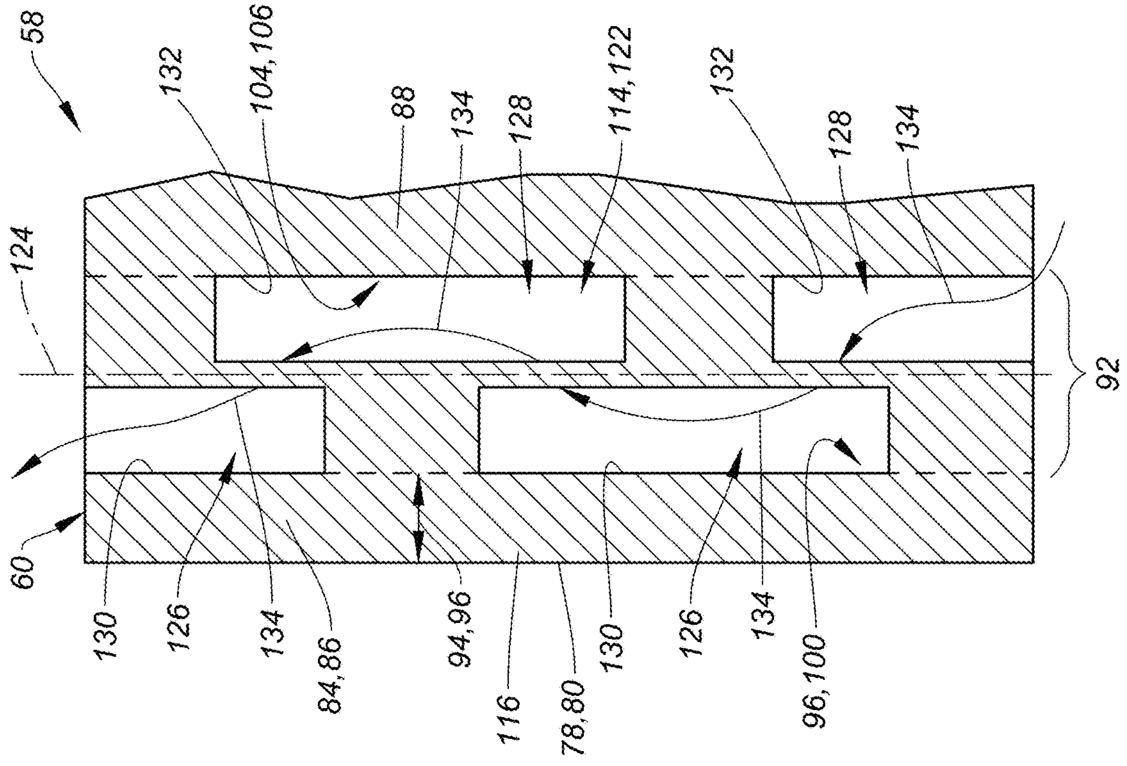
FIG. 6 schematically illustrates a cutaway view of a portion of the turbine blade, in accordance with one or more embodiments of the present disclosure.

Referring to FIGS. 3 and 4-6, each of the core body portions 92 forms one or more periodic passages 114 through the blade body 60. FIG. 4 illustrates a perspective view of the turbine blade 58 with the solid features of FIG. 4 representing the cavities 108 and the periodic passages 114 (i.e., the cavities 108 and the periodic passages 114 are depicted positively in FIG. 4). FIG. 5 illustrates a cross-sectional view of the turbine blade 58 of FIG. 4 taken along Line 5-5 of FIG. 4 and with the cavities 108 and the periodic passages 114 also depicted positively. FIG. 6 schematically illustrates a cutaway view of the blade body 60 along a plane extending through the pressure side surface 78 and the suction side surface 80 (e.g., orthogonal to the mean camber line 82).

Each of the pressure side wall 84 and the suction side wall 86 may be understood as a hot wall 116 of the blade body 60, which hot wall 116 is directly exposed to combustion gas flow through the turbine section 28 along the core flow path 54 (see FIG. 1). The intermediate wall 88 may be understood as a cold wall, which cold wall is separated from (e.g., is not directly exposed to) the combustion gas flow through the turbine section 28 along the core flow path 54. The term "periodic," as used herein for the periodic passages 114, refers to a configuration of the periodic passages 114 in which each of the periodic passages 114 is periodically (e.g., at regular or variable intervals) positioned in contact with (e.g., bounded by) the hot wall 116 and periodically separated from the hot wall 116 (e.g., by a respective one of the core body portions 92), from a coolant (e.g., air) inlet 118 of the respective one of the periodic passages 114 to a coolant outlet 120 of the respective one of the periodic passages 114. The term "periodic," as used herein for the periodic passages 114, refers to an additional configuration of the periodic passages 114 in which each of the periodic passages 114 is periodically positioned in contact with (e.g., bounded by) the intermediate wall 88 (e.g., the cold wall) and periodically separated from the intermediate wall 88 (e.g., by a respective one of the core body portions 92) from the coolant inlet 118 of the respective one of the periodic passages 114 to the coolant outlet 120 of the respective one of the periodic passages 114. The periodic passages 114 of FIGS. 4-6 are periodic in the spanwise direction.

FIGS. 4-6 illustrate an embodiment of the core body portions 92 and the one or more periodic passages 114 formed by each of the core body portions 92. Each of the periodic passages 114 extends between and to the coolant inlet 118 and the coolant outlet 120. The coolant inlet 118 may be disposed at (e.g., on, adjacent, or proximate) the base end 66 and the coolant outlet 120 may be disposed at (e.g., on, adjacent, or proximate) the tip end 68 (see FIG. 2). The present disclosure, however, is not limited to the foregoing exemplary positions of the coolant inlet 118 and the coolant outlet 120. Each of the periodic passages 114 of FIGS. 4-6 is a helical passage 122 centered about an axis 124 from the coolant inlet 118 to the coolant outlet 120. The axis 124 may extend in the spanwise direction or substantially in the spanwise direction.

Each of the periodic passages 114 includes at least one hot wall segment 126 and at least one cold wall segment 128. Each of the hot wall segments 126 is positioned along the hot wall 116 (e.g., the interior side 96 or the interior side 100) such that the hot wall 116 forms a portion of each of the hot wall segments 126 along an interior surface 130 of the hot wall 116. The interior surface 130 is positioned coincident with the core body portion 92 forming the respective one of the periodic passages 114. Each of the hot wall segments 126 is spaced from the intermediate wall 88 by the core body portion 92 forming the respective one of the periodic passages 114. Each of the cold wall segments 128 is positioned along the intermediate wall 88 (e.g., the pressure side 104 or the suction side 106) such that the intermediate wall 88 forms a portion of each of the cold wall segments 128 along an exterior surface 132 of the intermediate wall 88. The exterior surface 132 is positioned coincident with the core body portion 92 forming the respective one of the periodic passages 114. Each of the cold wall segments 128 is spaced from the hot wall 116 by the core body portion 92 forming the respective one of the periodic passages 114. The hot wall segments 126 and the cold wall segments 128 are alternatingly positioned along each of the periodic passages 114 between the coolant inlet 118 and the coolant outlet 120. The core body portion 92 may be understood to form all of the periodic passages 114 with the exception of the portions formed by the interior surface 130 and the exterior surface 132.

As shown in FIGS. 4 and 5, the core body portions 92 may form two of the periodic passages 114 having a double-helical configuration. For example, the core body portions 92 may form a first helical passage 122A and a second helical passage 122B. Each of the first helical passage 122A and the second helical passage 122B may be centered about the axis 124. The core body portions 92 may alternatively form more than two periodic passages 114 having a helical configuration centered about an axis (e.g., the axis 124). The first helical passage 122A and the second helical passage 122B may be fluidly independent (e.g., not connected in fluid communication) between their respective coolant inlets 118 and their respective coolant outlets 120. Each of the hot wall segments 126 of the first helical passage 122A may be disposed coincident with (e.g., in the spanwise direction) a respective one of the cold wall segments 128 of the second helical passage 122B. Similarly, each of the cold wall segments 128 of the first helical passage 122A may be disposed coincident with (e.g., in the spanwise direction) a respective one of the hot wall segments 126 of the second helical passage 122B.

In operation of the gas turbine engine 22 (see FIG. 1), compressed air (e.g., bleed air from the compressor section 24) may be directed into and through the turbine blade 58 to facilitate cooling of the blade body 60. As shown in FIG. 6, for example, compressed air may be directed through each of the periodic passages 114 along a coolant flow path 134. The compressed air along the coolant flow path 134 flows into and through the alternating hot wall segments 126 and cold wall segments 128 from the coolant inlet 118 to the coolant outlet 120. As the compressed air flows along the coolant flow path 134, the compressed air absorbs heat energy from the hot wall 116 (e.g., the pressure side wall 84 or the suction side wall 86) in the hot wall segments 126 and transfers that heat energy to the intermediate wall 88 in the cold wall segments 128. This transfer of heat energy from the hot wall 116 to the intermediate wall 88 facilitates a reduction in thermal gradients across the blade body 60 which may otherwise be aggravated by the intermediate wall 88 absent the core body portions 92 and respective periodic passages 114 of the present disclosure, thereby reducing stress across the blade body 60. Moreover, the core body portions 92 and the periodic passages 114 of the present disclosure facilitate improved cooling of the pressure side wall 84 and the suction side wall 86. In at least some conventional turbine blades, air flowing through coolant passages of the conventional turbine blades may tend to rapidly heat up due to continuous contact with the hot walls of the conventional turbine blades, thereby resulting in less effective cooling of the hot walls as the air flows from a cooling passage inlet to a cooling passage outlet. In contrast, compressed air along the coolant flow path 134 is periodically heated (e.g., at the hot wall 116) and cooled (e.g., at the intermediate wall 88), thereby resulting in more effective and consistent cooling along the coolant flow path 134. Compressed air exiting the periodic passages 114 at their respective coolant outlets 120 may be directed out of the blade body 60, for example, through one or more cooling holes (not shown) along the exterior of the blade body 60.

Figure 7:
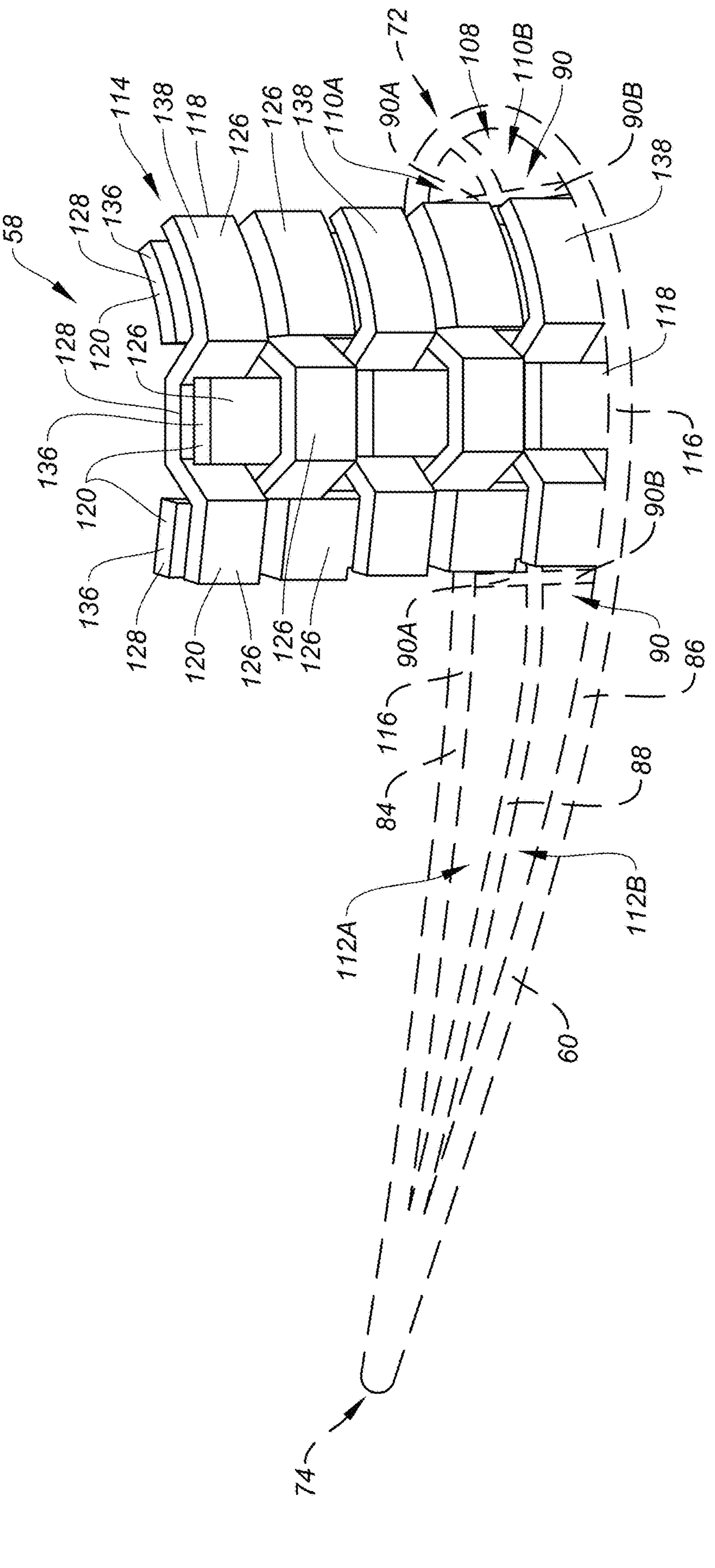
FIG. 7 illustrates a perspective view of a portion of another turbine blade with periodic passages of the turbine blade depicted positively, in accordance with one or more embodiments of the present disclosure.

FIG. 7 illustrates another embodiment of one of the core body portions 92 and the periodic passages 114 formed by the core body portion 92. FIG. 7 illustrates a cutaway, perspective view of the turbine blade 58 with the solid features of FIG. 7 representing the periodic passages 114 (i.e., periodic passages 114 are depicted positively in FIG. 7). The periodic passages 114 of FIG. 7 are shown for the suction side wall 86 (e.g., the periodic passages 114 formed by one of the second core body portions 92B), however, the configuration of the periodic passages 114 of FIG. 7 is equally applicable for the pressure side wall 84. The periodic passages 114 of FIG. 7 are arranged as a first subset 136 of the periodic passages 114 and a second subset 138 of the periodic passages 114. Each of the first subset 136 and the second subset 138 of FIG. 7 include three periodic passages 114, however, the present disclosure is not limited to any particular number of the periodic passages 114 in the first subset 136 or the second subset 136. The periodic passages 114 of the first subset 136 and the second subset 136 form a woven array of the periodic passages 114, wherein the periodic passages 114 of the first subset 136 and the second subset 136 are interspersed, as described in further detail below.

The periodic passages 114 of the first subset 136 of FIG. 7 are periodic in the spanwise direction. Each of the periodic passages 114 of the first subset 136 extends between and to the coolant inlet 118 and the coolant outlet 120. The periodic passages 114 of the first subset 136 may be fluidly independent (e.g., not connected in fluid communication) between their respective coolant inlets 118 and their respective coolant outlets 120. The coolant inlet 118 may be disposed at (e.g., on, adjacent, or proximate) the base end 66 and the coolant outlet 120 may be disposed at (e.g., on, adjacent, or proximate) the tip end 68 (see FIG. 2). The hot wall segments 126 of each of the periodic passages 114 of the first subset 136 are positioned along the hot wall 116 (e.g., the pressure side wall 84 or the suction side wall 86). Each of the hot wall segments 126 of each of the periodic passages 114 of the first subset 136 may be positioned adjacent (e.g., along a thickness of the blade body 60 between the pressure side surface 78 and the suction side surface 80) one of the cold wall segments 128 of one of the periodic passages 114 of the second subset 136. The cold wall segments 128 of each of the periodic passages 114 of the first subset 136 are positioned along the intermediate wall 88. Each of the cold wall segments 128 of each of the periodic passages 114 of the first subset 136 may be positioned adjacent (e.g., along a thickness of the blade body 60 between the pressure side surface 78 and the suction side surface 80) one of the hot wall segments 126 of one of the periodic passages 114 of the second subset 136.

The periodic passages 114 of the second subset 136 of FIG. 7 are periodic in the chordwise direction. Each of the periodic passages 114 of the second subset 136 extends between and to the coolant inlet 118 and the coolant outlet 120. The periodic passages 114 of the second subset 136 may be fluidly independent (e.g., not connected in fluid communication) between their respective coolant inlets 118 and their respective coolant outlets 120. The coolant inlet 118 may be disposed at (e.g., on, adjacent, or proximate) or otherwise connected in fluid communication with a cavity of the turbine blade 58 such as, but not limited to, the leading-edge cavities 110A, 110B. The coolant outlet 120 may be disposed at (e.g., on, adjacent, or proximate) or otherwise connected in fluid communication with another cavity of the turbine blade 58 such as, but not limited to, the trailing-edge cavities 112A, 112B. The hot wall segments 126 of each of the periodic passages 114 of the second subset 136 are positioned along the hot wall 116 (e.g., the pressure side wall 84 or the suction side wall 86). Each of the hot wall segments 126 of each of the periodic passages 114 of the second subset 136 may be positioned coincident with (e.g., along a thickness of the blade body 60 between the pressure side surface 78 and the suction side surface 80) one of the cold wall segments 128 of one of the periodic passages 114 of the first subset 136. The cold wall segments 128 of each of the periodic passages 114 of the second subset 136 are positioned along the intermediate wall 88. Each of the cold wall segments 128 of each of the periodic passages 114 of the second subset 136 may be positioned coincident with (e.g., along a thickness of the blade body 60 between the pressure side surface 78 and the suction side surface 80) one of the hot wall segments 126 of one of the periodic passages 114 of the first subset 136.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A turbine blade for a gas turbine engine, the turbine blade comprising:

a blade body extending in a spanwise direction between and to a base end and a tip end, the blade body extending in a chordwise direction between and to a leading edge and a trailing edge, the blade body including a pressure side wall, a suction side wall, an intermediate wall, and at least one core body portion, the pressure side wall or the suction side wall forming a hot wall of the blade body, the hot wall extends between and to the leading edge and the trailing edge, the intermediate wall is disposed between the pressure side wall and the suction side wall, and the intermediate wall extends between the leading edge and the trailing edge, and the at least one core body portion is disposed between the hot wall and the intermediate wall, the at least one core body portion forms at least one periodic passage through the blade body, the at least one periodic passage includes at least one hot wall segment and at least one cold wall segment, the hot wall segment is further formed by the hot wall and spaced from the intermediate wall by the at least one core body portion, and the cold wall segment is further formed by the intermediate wall and spaced from the hot wall by the at least one core body portion;

wherein the at least one periodic passage includes a first helical periodic passage centered about a passage axis.

2. The turbine blade of claim 1, wherein the at least one periodic passage is periodic in the spanwise direction.

3. The turbine blade of claim 1, wherein the at least one periodic passage is periodic in the chordwise direction.

4. The turbine blade of claim 1, wherein the at least one periodic passage includes a second helical periodic passage centered about the passage axis.

5. The turbine blade of claim 1, wherein the at least one periodic passage includes a plurality of periodic passages, a first subset of the plurality of periodic passages are periodic in the spanwise direction, and a second subset of the plurality of periodic passages are periodic in the chordwise direction.

6. The turbine blade of claim 5, wherein the first subset of the plurality of periodic passages and the second subset of the plurality of periodic passages form a woven array of the plurality of periodic passages.

7. The turbine blade of claim 1, wherein the pressure side wall, the suction side wall, the intermediate wall, and the at least one core body portion form a unitary component of the blade body.

8. The turbine blade of claim 1, wherein the blade body further includes a plurality of ribs including a first rib and a second rib, the first rib and the second rib extend between and to the hot wall and the intermediate wall, and the at least one core body portion is disposed between the first rib and the second rib.

9. The turbine blade of claim 1, wherein the blade body has a mean camber line extending through the leading edge and the trailing edge, and the intermediate wall extends along the mean camber line between the leading edge and the trailing edge.

10. A turbine blade for a gas turbine engine, the turbine blade comprising:

a blade body extending in a spanwise direction between and to a base end and a tip end, the blade body extending in a chordwise direction between and to a leading edge and a trailing edge, the blade body including a pressure side wall, a suction side wall, an intermediate wall, a first core body portion, and a second core body portion, each of the pressure side wall and the suction side wall extends between and to the leading edge and the trailing edge, the intermediate wall is disposed between the pressure side wall and the suction side wall, and the intermediate wall extends between the leading edge and the trailing edge, and the first core body portion is disposed between the pressure side wall and the intermediate wall, the second core body portion is disposed between the suction side wall and the intermediate wall, each of the first core body portion and the second core body portion forms at least one periodic passage through the blade body, each of the at least one periodic passage extends between and to a coolant inlet and a coolant outlet, each of the at least one periodic passage includes a plurality of hot wall segments and a plurality of cold wall segments alternatingly positioned with the hot wall segments between the coolant inlet and the coolant outlet;

wherein each of the at least one periodic passage is a helical periodic passage centered about a passage axis.

11. The turbine blade of claim 10, wherein the at least one periodic passage includes a first periodic passage and a second periodic passage.

12. The turbine blade of claim 11, wherein the first periodic passage and the second periodic passage are fluidly independent.

13. The turbine blade of claim 11, wherein the first periodic passage and the second periodic passage extend in a same direction.

14. A turbine blade for a gas turbine engine, the turbine blade comprising:

a blade body extending in a spanwise direction between and to a base end and a tip end, the blade body extending in a chordwise direction between and to a leading edge and a trailing edge, the blade body including a pressure side wall, a suction side wall, an intermediate wall, and at least one core body portion, the pressure side wall or the suction side wall forming a hot wall of the blade body, the hot wall extends between and to the leading edge and the trailing edge, the intermediate wall is disposed between the pressure side wall and the suction side wall, and the intermediate wall extends between the leading edge and the trailing edge, and the at least one core body portion is disposed between the hot wall and the intermediate wall, the at least one core body portion forms a first periodic passage and a second periodic passage through the blade body, each of the first periodic passage and the second periodic passage includes a plurality of hot wall segments and a plurality of cold wall segments, each of the plurality of hot wall segments is further formed by the hot wall and spaced from the intermediate wall by the at least one core body portion, each of the plurality of cold wall segments is further formed by the intermediate wall and spaced from the hot wall by the at least one core body portion, and at least one of the hot wall segments of the first periodic passage is disposed coincident with at least one of the cold wall segments of the second periodic passage.

15. The turbine blade of claim 14, wherein the first periodic passage and the second periodic passage are periodic in the spanwise direction.

16. The turbine blade of claim 14, wherein the first periodic passage is periodic in the spanwise direction and the second periodic passage is periodic in the chordwise direction.

17. The turbine blade of claim 14, wherein the pressure side wall, the suction side wall, the intermediate wall, and the at least one core body portion form a unitary component of the blade body.

18. The turbine blade of claim 14, wherein the blade body further includes a plurality of ribs including a first rib and a second rib, the first rib and the second rib extend between and to the hot wall and the intermediate wall, and the at least one core body portion is disposed between the first rib and the second rib.

* * * * *